(No Model.) 4 Sheets—Sheet 1.

B. W. GRIST.
MEANS FOR SUPPORTING DRUMS OR PULLEYS.

No. 495,884. Patented Apr. 18, 1893.

Witnesses
D. A. Vauberschmidt
H. B. Reinohl

Inventor
Benj. W. Grist.
By D. C. Reinohl
Attorney (No Model.) 4 Sheets—Sheet 2.
B. W. GRIST.
MEANS FOR SUPPORTING DRUMS OR PULLEYS.

No. 495,884. Patented Apr. 18, 1893.

Witnesses
D. A. Tauberschmidt
H. B. Reinohl

Inventor
Benj. W. Grist
By D. C. Reinohl
Attorney (No Model.) 4 Sheets—Sheet 3.

B. W. GRIST.
MEANS FOR SUPPORTING DRUMS OR PULLEYS.

No. 495,884. Patented Apr. 18, 1893.

Witnesses
J. A. Fauberschmidt
H. B. Reinohl

Inventor
Benj. W. Grist
By D. C. Reinohl
Attorney (No Model.) 4 Sheets—Sheet 4.

B. W. GRIST.
MEANS FOR SUPPORTING DRUMS OR PULLEYS.

No. 495,884. Patented Apr. 18, 1893.

Witnesses
J. A. Vauberschmidt,
H. B. Reinohl

Inventor
Benj. W. Grist
By D. L. Reinohl
Attorney

UNITED STATES PATENT OFFICE.

BENJAMIN W. GRIST, OF PHILADELPHIA, PENNSYLVANIA, ASSIGNOR TO THE PENNSYLVANIA IRON WORKS COMPANY, OF SAME PLACE.

MEANS FOR SUPPORTING DRUMS OR PULLEYS.

SPECIFICATION forming part of Letters Patent No. 495,884, dated April 18, 1893.

Application filed December 20, 1892. Serial No. 455,805. (No model.)

*To all whom it may concern:*

Be it known that I, BENJAMIN W. GRIST, a citizen of the United States, residing at Philadelphia, in the county of Philadelphia and State of Pennsylvania, have invented certain new and useful Improvements in Means for Supporting Drums or Pulleys; and I do hereby declare the following to be a full, clear, and exact description of the invention, such as will enable others skilled in the art to which it appertains to make and use the same.

My present invention relates primarily to machinery for transmitting power in cable railway systems, but is not limited thereto in its application, and has for its object the construction of means for relieving the drum shaft of the weight of the drum when not in service, to prevent wear upon the shaft and the bearing in the drum.

The invention will be fully disclosed in the following specification and claims.

Figure 1:
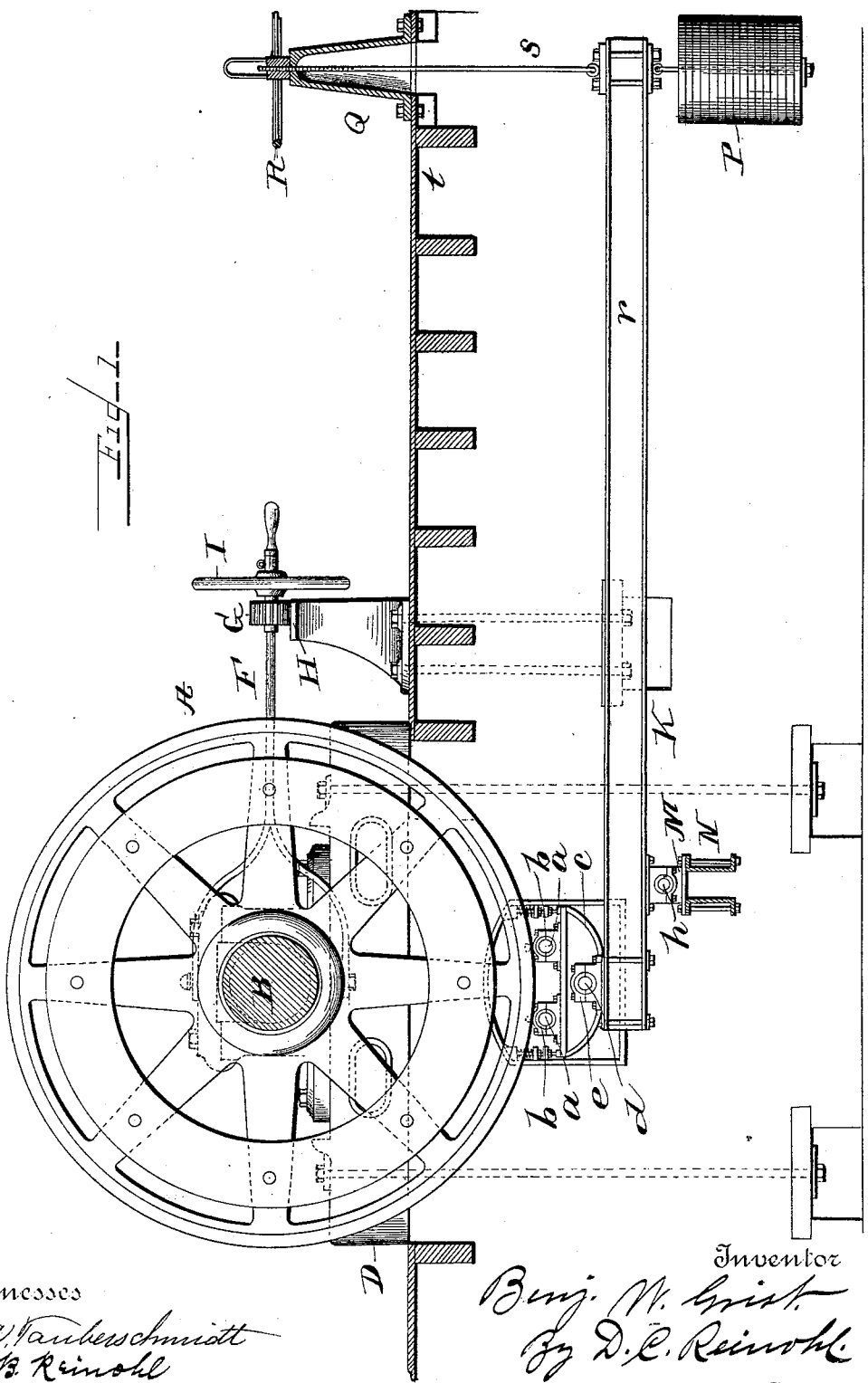
Figure 2:
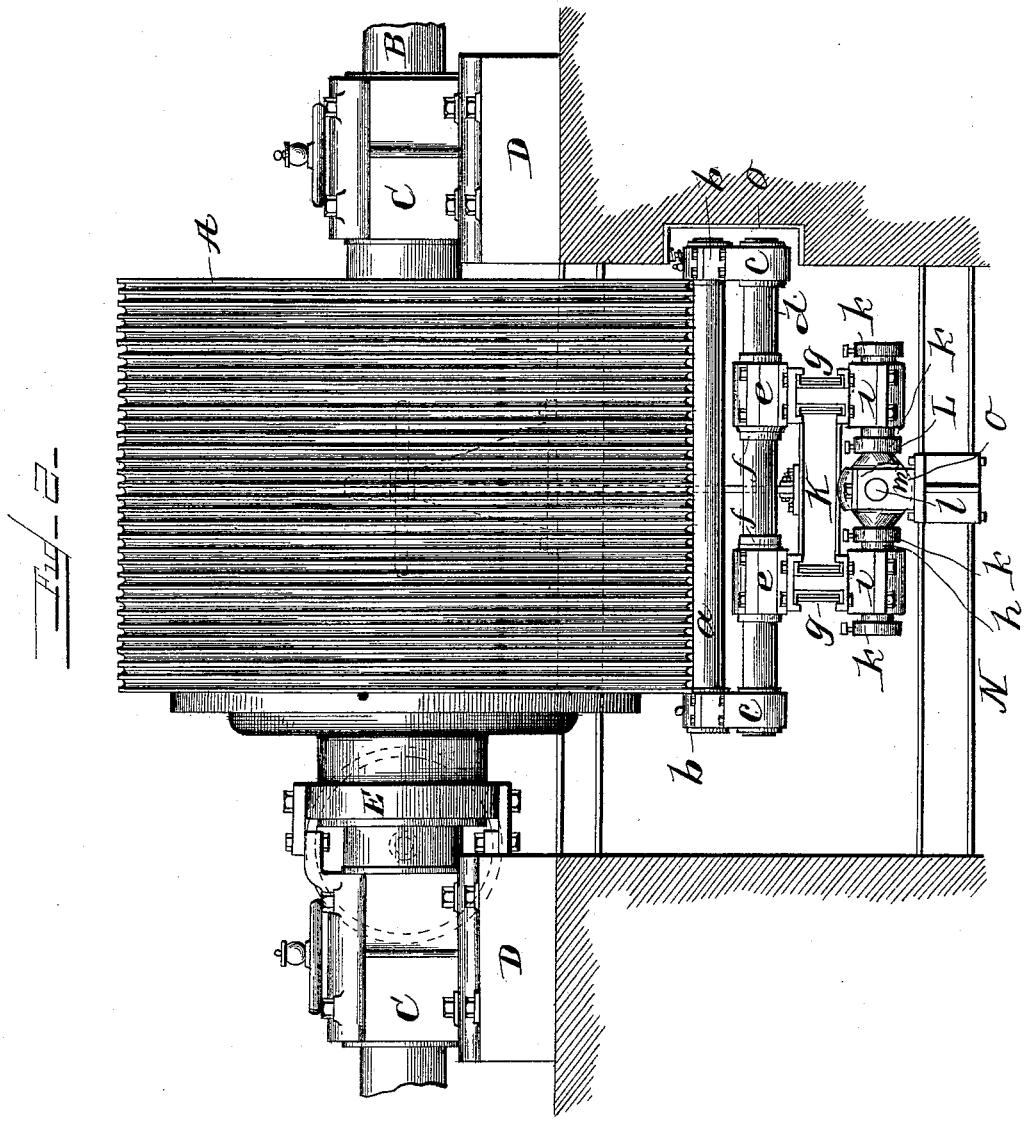
Figure 3:
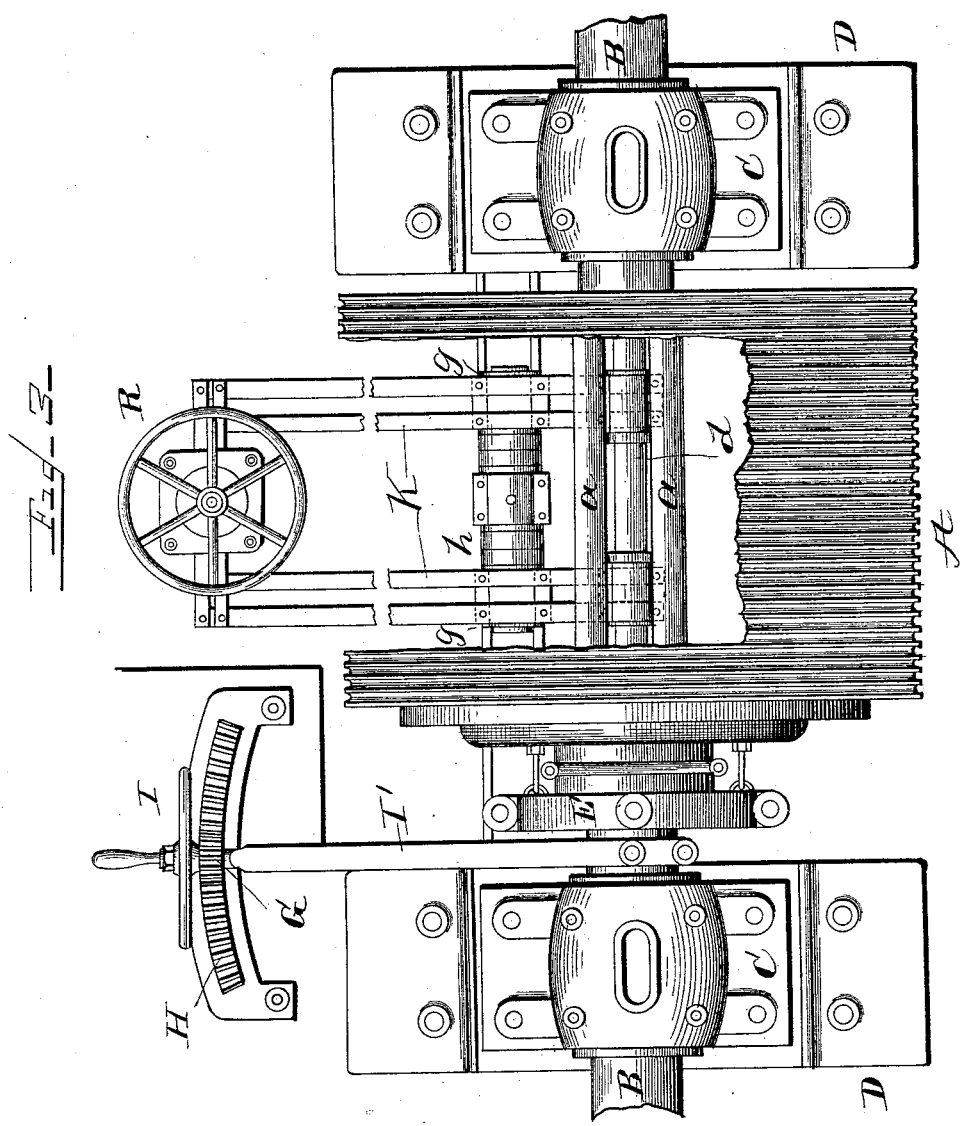
Figure 4:
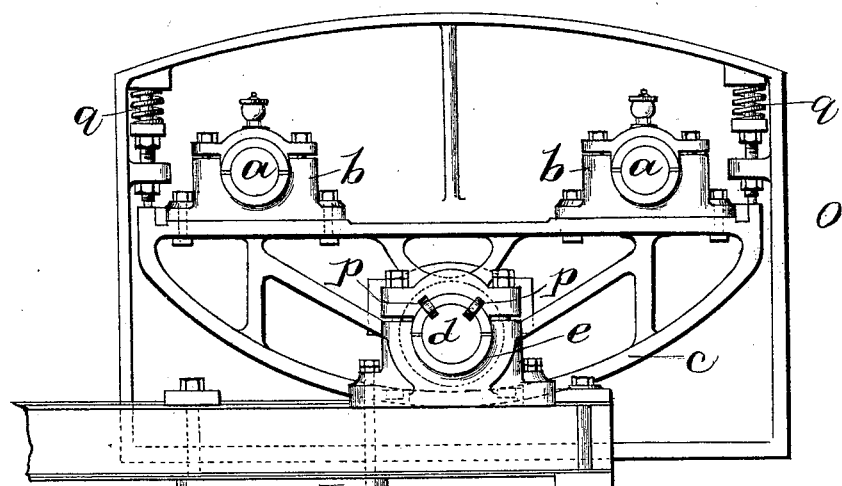
Figure 5:
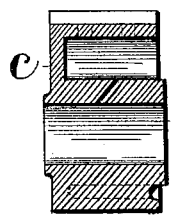

In the accompanying drawings, which form part of this specification Figure 1, represents an end elevation partly in section; Fig. 2, a side view; Fig. 3, a top plan view partly in section; Fig. 4, an enlarged end view of part of Fig. 1 showing the roller supporting-frame, part of the lever and its support; Fig. 5, a cross section of said supporting frame, and Fig. 6 a side elevation partly in section of supporting shaft bearing.

Reference being had to the drawings and the letters thereon, A indicates a multi-grooved cable or rope drum, B the shaft upon which the drum is mounted to revolve loosely when not in service for transmitting power, C, C, pillow-blocks for supporting the shaft B, and rest upon suitable timbers D D or upon part of the engine frame or bed-plate.

E indicates a clutch for engaging the drum A with the shaft B, and disengaging it therefrom, and is operated by a lever F on which is secured a pinion G which engages a stationary rack H, and a hand-wheel I. These several parts may be of any approved form of construction and constitute no part of my invention.

Figure 6:
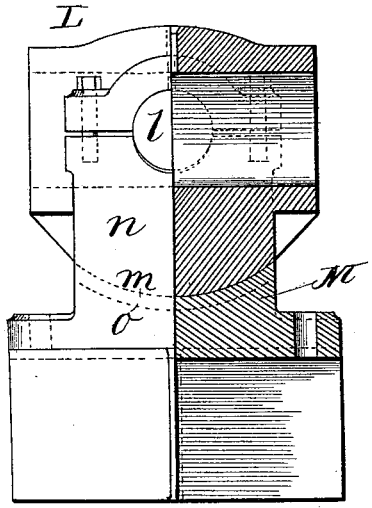

Under the drum A is a cradle composed of rollers $a\ a$ supported at their ends in journal-bearings $b\ b$ to revolve freely therein when in contact with the periphery of the drum. The journal-bearings are supported on yokes $c\ c$ which connect the rollers and secure them in their relative position, and the yokes are supported on the ends of a shaft $d$ on which they are free to move axially to admit of automatic adjustment of the cradle to bring both the rollers against the periphery of the drum. On the shaft $d$ are journal-bearings $e\ e$ secured in position by collars $f\ f$ and rest upon and are each secured to one side $g, g$ of a counterbalancing lever K made preferably of channel-iron. The lever K is fulcrumed upon a shaft $h$ supported at its ends in journal-bearings $i, i$ secured to the under side of the arms $g\ g$, and in the center in a journal-bearing L; and on said shaft $h$ are collars $k, k$, to prevent lateral movement of the bearings $i, i$, on the shaft. The journal-bearing L is provided with trunnions $l$, one on each side and with a convex seat $m$; the trunnions being supported in the vertical sides $n$, of the pedestal M and the convex seat $m$ resting upon the concave bearing surface $o$ between the sides $n$ as shown in Figs. 2 and 6; and the pedestal rests upon and is secured to a girder N, preferably of channel-iron suitably supported in masonry.

The shaft $h$ is secured in the journal-bearing L against revolving therein by suitable set-screws $p\ p$, but the shaft $h$, the lever K and the cradle are free to move laterally (to adjust the rollers to the drum) in the bearing between the sides of the pedestal M, while the cradle is adjusted transversely to the bearing surface or periphery of the drum by the movement of the yokes $c\ c$ supporting the rollers $a\ a$, on the shaft $d$. By these two adjustments of the cradle the rollers are brought to bear evenly throughout their length upon the periphery of the drum and thus distribute the weight of the drum on the cradle.

To provide for the arrest of the cradle in its upward movement and to bring it to a state of rest at both ends against the drum, I provide a metallic frame O which is walled in the masonry of the foundation, and within which one of the yokes $c$ operates and is cushioned by springs $q\ q$ interposed between the upper side of the frame, as shown in Figs. 1 and 4 and thus prevents a shock or jar of the parts.

To the outer end of the counter-balancing lever K is attached a weight P composed of a number of disks, which with the long arm $r$ of the lever are of sufficient weight to support the cradle and take or sustain the weight of the drum and relieve the shaft B of said weight and prevent "cutting fast" between the shaft and the bore in the hub of the drum. The outer end of the lever K is connected to a rod $s$ which is screw-threaded at its upper end, passes through the floor $t$ and the stand Q and engages with the screw-threaded hub of a hand wheel R, by which the cradle is raised into contact with the periphery of the drum A and the drum raised independently of its shaft by lowering the outer end of the lever K, and released from contact therewith and the drum lowered by raising the outer end of said lever.

While I have shown my invention applied to the cable drum of cable railway machinery, I do not limit its use thereto, as it may be used on hoisting machinery and in many other places where revolving drums and pulleys are loosely secured to their shafts, and in all such uses the weight of the drum is to be sustained only when the shaft is revolving independently of the drum or pulley, that is when no work is required of the drum, and the shaft is revolving; but it is obvious that the device may be applied to relieve the shafts having a drum or pulley secured thereto to revolve continuously with the shaft at such time when no work is being performed by the drum or pulley.

Having thus fully described my invention, what I claim is—

1. The combination of a shaft, a drum or pulley mounted thereon, a device engaging the periphery of the drum for supporting the weight thereof; and means to raise and lower the drum independently of its shaft.

2. The combination of a shaft, a drum or pulley mounted thereon, a cradle provided with revoluble bearings to engage the periphery of the drum; and means for operating said cradle to raise and lower the drum independently of its shaft.

3. The combination of a shaft, a drum or pulley mounted thereon, a cradle provided with revoluble bearings to engage the periphery of the drum below and on both sides of the axis of the shaft; and means for operating said cradle to raise and lower the drum independently of its shaft.

4. A drum or pulley provided with a hub, a shaft supported in fixed bearings and passing through said hub and normally supporting said drum, in combination with a drum-supporting device; and means for operating said device to raise and lower the drum independently of its shaft.

5. The combination of a shaft, a drum or pulley mounted thereon, a vertically adjustable cradle to engage the periphery of the drum and a fulcrumed lever provided with a counter-weight.

6. The combination of a shaft, a drum or pulley mounted thereon, a cradle provided with rollers to engage the periphery of the drum and means for admitting of automatic adjustment of the cradle to the drum.

7. The combination of a shaft, a drum or pulley mounted thereon, a cradle to engage the periphery of said drum, and means for admitting of adjustment of the cradle in a line parallel with said shaft and at a right angle thereto.

8. The combination of a shaft, a drum or pulley mounted thereon, a cradle to engage the periphery of said drum, a shaft on which said cradle is movably supported to admit of adjustment on both sides of the transverse center of the drum, and a bearing to admit of adjustment on both sides of the longitudinal center of said drum.

9. The combination of a shaft, a drum or pulley mounted thereon, a cradle to engage the periphery of said drum, a counter-balancing lever, and means for engaging and disengaging the cradle with and from said drum.

10. The combination of a shaft, a drum or pulley mounted thereon, a cradle consisting of a pair of rollers, a yoke at each end of said rollers, and a shaft supporting the yoke, and on which said cradle is axially movable and a lever on which the shaft supporting the cradle is supported.

11. The combination of a shaft, a drum or pulley mounted thereon, a cradle having rollers to engage the periphery of the drum, a lever supporting the cradle, a movable fulcrum for said lever, counter-weights attached to said lever and means for lowering and raising the weighted end of the lever.

12. The combination of a shaft, a drum or pulley mounted thereon, a cradle consisting of a pair of rollers, a yoke at each end of said rollers, and a shaft supporting the yoke and on which said cradle is axially movable; a fixed frame and cushions between one of the yokes and said frame.

13. The combination of a shaft, a drum or pulley mounted thereon, a clutch mechanism, means for supporting the weight of said drum when disengaged from the shaft and a device for positively raising and lowering the drum supporting mechanism.

14. The combination of a shaft, a drum loosely mounted thereon, a cradle to engage the periphery of said drum, a lever supporting said cradle, a shaft supporting the lever, and a bearing for said shaft trunnioned in a pedestal having a concave bearing seat.

In testimony whereof I affix my signature in presence of two witnesses.

BENJAMIN W. GRIST.

Witnesses:
JAMES E. GRIST,
EDWIN A. MOORE.